(12) United States Patent
Wang et al.

(10) Patent No.: US 7,773,538 B2
(45) Date of Patent: Aug. 10, 2010

(54) ESTIMATING ORIGIN-DESTINATION FLOW ENTROPY

(75) Inventors: Jia Wang, Randolph, NJ (US); Mitsunori Ogihara, Pinecrest, FL (US); Oliver Spatscheck, Randolph, NJ (US); Ashwin Lall, Rochester, NY (US); Jun Xu, Atlanta, GA (US); Haiquan Zhao, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 238 days.

(21) Appl. No.: 12/122,295

(22) Filed: May 16, 2008

(65) Prior Publication Data

US 2009/0285117 A1    Nov. 19, 2009

(51) Int. Cl.
*H04L 12/26* (2006.01)
(52) U.S. Cl. ........................ 370/253; 709/223
(58) Field of Classification Search .......... 370/241, 370/248, 250, 252, 253, 254, 255; 709/223–226; 707/6
See application file for complete search history.

(56) References Cited

U.S. PATENT DOCUMENTS

| | | | |
|---|---|---|---|
| 5,764,740 | A | 6/1998 | Holender |
| 6,046,988 | A | 4/2000 | Schenkel et al. |
| 6,931,400 | B1 | 8/2005 | Indyk et al. |
| 2006/0053123 | A1* | 3/2006 | Ide et al. ............... 707/100 |
| 2009/0271509 | A1* | 10/2009 | Cao et al. ............... 709/224 |

OTHER PUBLICATIONS

Zhao et al. "A data Streaming Algorithm for Estimating Entropies of OD flows" Internet Measurement Conference archive Proceedings of the 7th ACM SIGCOMM conference on Internet measurement San Diego, California, USA Session: Sampling and streaming pp. 279-290 Year of Publication: 2007 ACM 978-1-59593-908-1.*

Lall et al. "A data Steraming Algorithm for Estimating Entropies of OD Flows" presentation accessed from www2.research.att.com/~jiawang/flow-entropy-talk.pdf Oct. 25, 2007.*

A. Chakrabarti, K. Do Ba and S. Muthukrishnan, "Estimating Entropy and Entropy Norm on Data Streams," Proceedings of the 23rd International Symposium on Theoretical Aspects of Computer Science (STACS), pp. 196-205 (2006).

L. Bhuvanagiri and S. Ganguly, "Estimating Entropy Over Data Streams," ESA, pp. 148-159 (2006).

D. Brauckhoff, B. Tellenbach, A. Wagner and M. May, "Impact of Packet Sampling on Anomaly Detection Metrics," IMC '06: Proceedings of the 6th ACM SIGCOMM on Internet Measurement, pp. 159-164 (2006).

(Continued)

*Primary Examiner*—Ricky Ngo
*Assistant Examiner*—Gary Mui
(74) *Attorney, Agent, or Firm*—Hoffmann & Baron, LLP

(57) ABSTRACT

The preferred embodiments of the present invention are directed to estimating entropy of origin-destination (OD) data flows in a network. To achieve this, first and second sketches are created corresponding to ingress (i.e. origin) and egress (i.e. destination) flows. The sketches allow estimating entropy associated with data streams as well as entropy associated with an intersection of two or more of the data streams, which provides a mechanism for estimating the entropy OD flows in a network.

15 Claims, 7 Drawing Sheets

OTHER PUBLICATIONS

A. Chakrabarti, G. Cormode and A. McGregor, "A Near-Optimal Algorithm for Computing the Entropy of a Stream," SODA, pp. 328-335 (2007).

J.M. Chambers, C.L. Mallows and B.W. Stuck, "A Method for Simulating Stable Random Variables," Journal of the American Statistical Association, pp. 340-344, 71:354(1976).

G. Cormode, "Stable Distributions for Stream Computations: It's as Easy as 0,1,2," Workshop on Management and Processing of Data Streams, 2 pages (2003).

G. Cormode, P. Indyk, N. Koudas and S. Muthukrishnan, "Fast Mining of Massive Tabular Data via Approximate Distance Computations," ICDE '02: Proceedings of the 18th International Conference on Data Engineering, pp. 605-616 (2002).

C. Estan and G. Varghese, "New Directions in Traffic Measurement and Accounting," Proceedings of ACM SIGCOMM, pp. 323-336 (2002).

L. Feinstein, D. Schnackenberg, R. Balupari and D. Kindred, "Statistical Approaches to DDoS Attack Detection and Response," Proceedings of the DARPA Information Survivability Conference and Exposition, 12 pages (2003).

P. Indyk, "Stable Distributions, Pseudorandom Generators, Embeddings and Data Stream Computation," FOCS '00: Proceedings of the 41st Annual Symposium on Foundations of Computer Science, Washington, DC, USA, 9 pages (2000) IEEE Computer Science.

P. Indyk, "Stable Distributions, Pseudorandom Generators, Embeddings, and Data Stream Computation," J. ACM, 53:3, pp. 307-323 (2006).

A. Lakhina, M. Crovella and C. Diot, "Mining Anomalies Using Traffic Feature Distributions," Proceedings of ACM SIGCOMM, 12 pages (2005).

A. Lall, V. Sekar, M. Ogihara, J. Xu and H. Zhang, "Data Streaming Algorithms for Estimating Entropy of Network Traffic," SIGMETRICS/Performance, 12 pages (2006).

G.S. Manku and R. Motwani, "Approximate Frequency Counts over Data Streams," In Proceedings of the 28th International Conference on Very Large Data Bases, 12 pages (2002).

A. Medina, N. Taft, K. Salamatian, S. Bhattacharyya and C. Diot, "Traffic Matrix Estimation: Existing Techniques and New Directions," Proc. ACM SIGCOMM, 14 pages (Aug. 2002).

A. Soule, A. Nucci, R. Cruz, E. Leonardi and N. Taft, "How to Identify and Estimate the Largest Traffic Matrix Elements in a Dynamic Environment," Proc. ACM SIGMETRICS, pp. 73-84 (Jun. 2004).

C. Tebaldi and M. West, "Bayesian Inference on Network Traffic Using Link Count Data," Journal of American Statistics Association, pp. 557-576 (1998).

Y. Vardi, "Network Tomography: Estimating Source-Destination Traffic Intensities From Link Data," Journal of American Statistics Association, 91:433, pp. 365-377 (1996).

A. Wagner and B. Plattner, "Entropy Based Worm and Anomaly Detection Fast IP Networks," Proceedings of IEEE International Workshop on Enabling Technologies, Infrastructures for Collaborative Enterprises, 6 pages (2005).

K. Xu, Z.-L. Zhang and S. Bhattacharyya, "Profiling Internet Backbone Traffic: Behavior Models and Applications," Proceedings of ACM SIGCOMM, pp. 169-180 (2005).

Q. Zhao, Z. Ge, J. Wang and J. Xu, "Robust Traffic Matrix Estimation with Imperfect Information: Making Use of Multiple Data Sources," Proc. of ACM SIGMETRICS '06/Performance '06, pp. 133-144 (2006).

Q. Zhao, A. Kumar, J. Wang and J. Xu, "Data Streaming Algorithms for Accurate and Efficient Measurement of Traffic and Flow Matrices," Proc. of ACM SIGMETRICS, 12 pages (Jun. 2005).

M. Durand and P. Flajolet, "Loglog Counting of Large Cardinalities," ESA 2003, pp. 605-617 (2003).

A. Kuzmanovic and E.W. Knightly, "Low-Rate TCP-Targeted Denial of Service Attacks," SIGCOMM'03, pp. 75-96 (2003).

Y. Zhang, Z.M. Mao and Jia Wang, "Low-Rate TCP-Targeted DoS Attack Disrupts Internet Routing," In Proc. 14th Annual Network & Distributed System Security Symposium, pp. 1-15 (2007).

S. Muthukrishnan, "Data Streams: Algorithms and Applications," http://athos.rutgers.edu/~muthu/, 67 pages.

A. Kuzmanovic and E.W. Knightly, "Low-Rate TCP-Targeted Denial of Service Attacks (The Shrew vs. the Mice and Elephants)," In SIGCOMM, 12 pages (2003).

J. Nolan, STABLE program, online at http://academic2.american.edu/~jpnolan/stable/stable.html, 4 pages.

G. Casella and R.L. Berger, "Statistical Inference," Duxbury, 2nd Edition, pp. 482-485 (2002).

V.M. Zolotarev, "One-Dimensional Stable Distributions," Translations of Mathematical Monographs, American Mathematical Society, Providence, RI, vol. 65, pp. 5-6 (1986).

* cited by examiner

FIG. 4

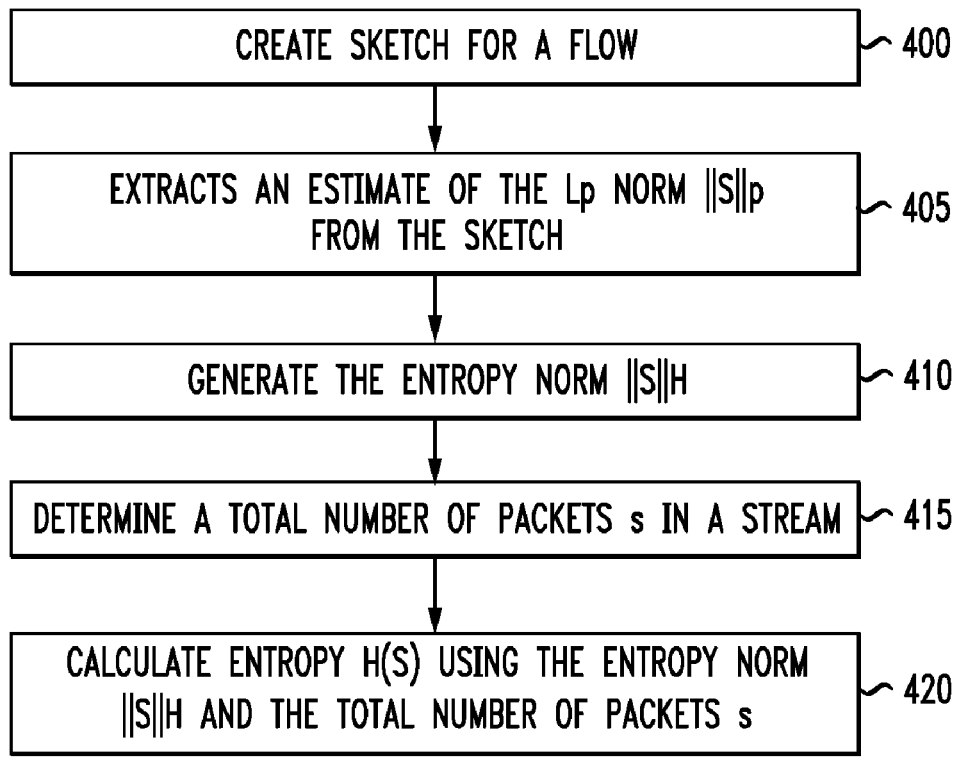

- CREATE SKETCH FOR A FLOW — 400
- EXTRACTS AN ESTIMATE OF THE Lp NORM $\|S\|_p$ FROM THE SKETCH — 405
- GENERATE THE ENTROPY NORM $\|S\|_H$ — 410
- DETERMINE A TOTAL NUMBER OF PACKETS s IN A STREAM — 415
- CALCULATE ENTROPY H(S) USING THE ENTROPY NORM $\|S\|_H$ AND THE TOTAL NUMBER OF PACKETS s — 420

FIG. 5

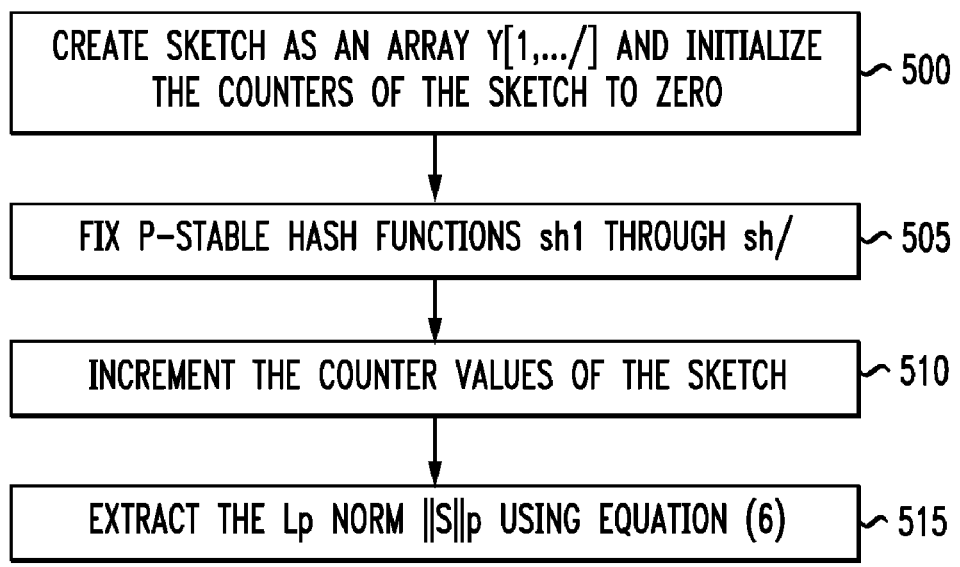

- CREATE SKETCH AS AN ARRAY Y[1,...,l] AND INITIALIZE THE COUNTERS OF THE SKETCH TO ZERO — 500
- FIX P-STABLE HASH FUNCTIONS sh1 THROUGH shl — 505
- INCREMENT THE COUNTER VALUES OF THE SKETCH — 510
- EXTRACT THE Lp NORM $\|S\|_p$ USING EQUATION (6) — 515

ESTIMATING ORIGIN-DESTINATION FLOW ENTROPY

BACKGROUND

1. Field of the Invention

The preferred embodiments of the present invention are directed to an approach for estimating entropies of origin-destination flows in a network.

2. Brief Description of the Related Art

Detection and diagnosis of network anomalies is important for network maintenance and troubleshooting. There are various automated processes for detecting and diagnosing network anomalies based on the status of or data stored by routers. Recently, the entropy of network traffic has been proposed, in many different contexts, as an effective and reliable metric for anomaly detection and diagnosis. Measuring this quantity exactly in real time, however, is typically not possible on high-speed links due to prohibitively high computational and memory requirements. For this reason, various data streaming algorithms have been proposed to approximate this quantity. Data streaming is concerned with processing a long stream of data items in one pass to answer a class of queries regarding the stream.

It is often important to know the entropies of origin-destination (OD) flows. An OD flow represents the traffic that enters an ingress point (called an origin) and exits at an egress point (called a destination). Knowing these quantities allows for more insight into the dynamics of traffic inside an Internet service provider (ISP) network. However, the conventional entropy estimation algorithms generally cannot be extended to solve the entropies of OD flows in a network.

SUMMARY OF THE INVENTION

Preferred embodiments are directed to a method, medium, and system, which can include a computing device, for estimating entropy in a network. A first sketch associated with at least one ingress flow in a network is generated and a second sketch associated with at least one egress flow in the network is generated. The first sketch can be generated by passing a packet to a bucket based on a flow label associated with the packet and incrementing at least one counter in the first sketch based on a packet identification associated with the packet. The at least one ingress flow and egress flow form a origin-destination flow pair. An origin-destination (OD) flow entropy based on the first and second sketches is determined.

To determine the OD flow entropy, a first Lp norm is extracted from the first sketch and a second Lp norm is extracted from the second sketch. An intersection between the first and second sketches is determined using the Intersection Measurable Property (IMP). An entropy norm can be determined using the intersection between the first and second sketches and an approximation for xlnx. A total number of packets in a stream can be determined using at least one of the first and second sketches, which can be used when determining the OD flow entropy. An estimate for the OD flow entropy can be computed using the entropy norm and the total number of packets.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 4 is a flowchart showing a preferred implementation for estimating the entropy using the entropy estimator 200;

FIG. 5 is a flowchart showing a implementation for generating sketches and estimating the Lp norm $\|S\|_p$ from the sketches;

DETAILED DESCRIPTION OF THE PREFERRED EMBODIMENTS

Figure 1:
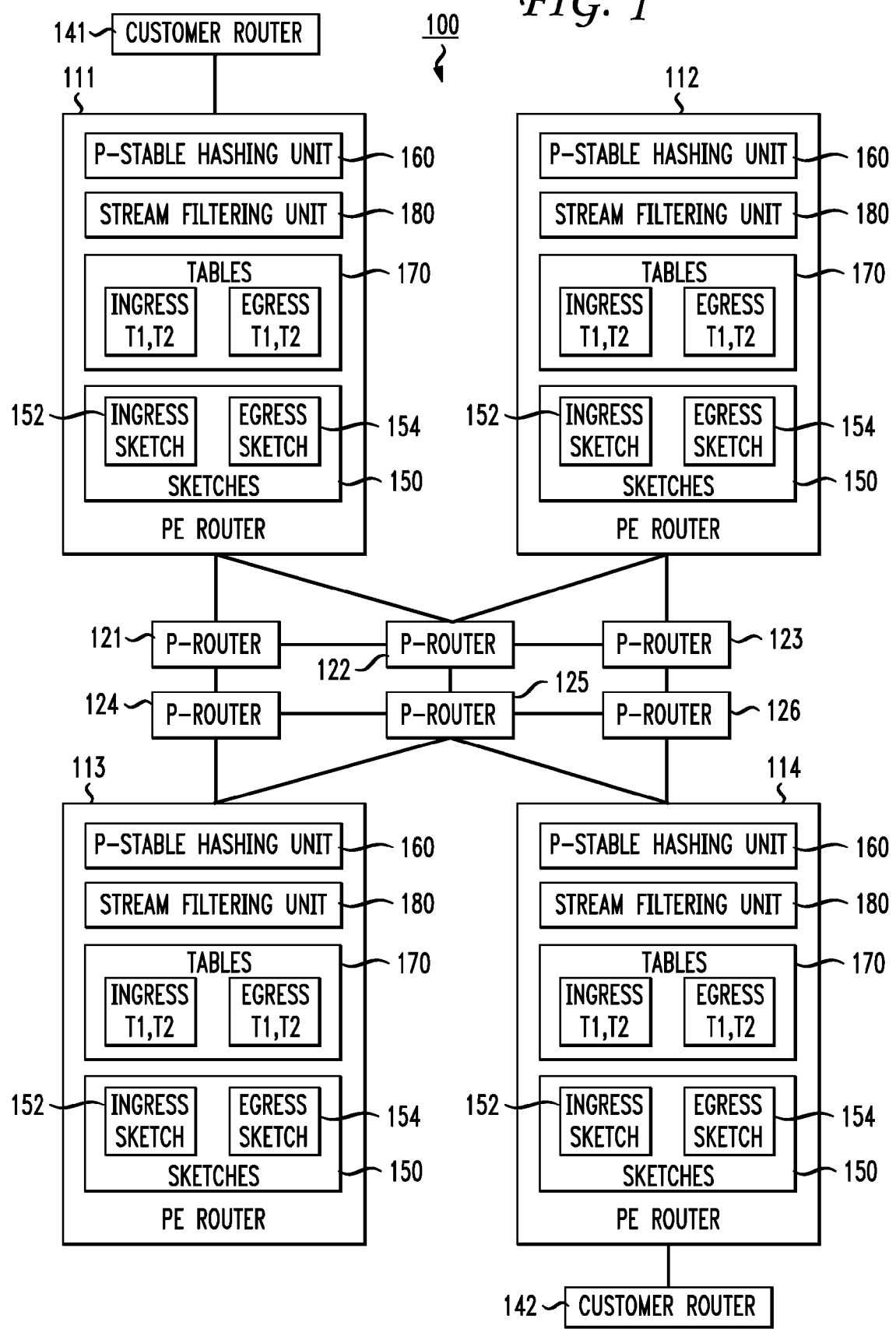
FIG. 1 shows a portion of an exemplary network.

The preferred embodiments of the present invention are directed to estimating entropy of origin-destination (OD) data flows in a network. To achieve this, one or more data structures, referred to herein as sketches, are created for ingress (i.e. origin) and egress (i.e. destination) flows. The sketches allow estimating entropy associated with data streams as well as entropy associated with an intersection of two or more of the data streams, which provides a mechanism for estimating the entropy OD flows in a network.

A flow, as used herein, refers to data packets that have identical values in their headers, which may preferably include some combination of a source address, destination address, source port, destination port, and protocol. Entropy is a network metric that indicates changes in data stream flows in a network. A sketch, as used herein, is a lower dimensional vector used to represent higher dimensional data and preferably includes counters for tracking information associated with data stream flows in a network. The ability to compute the intersection of two or more data streams from their sketches is referred to herein as the intersection measurable property (IMP). Ingress nodes and egress nodes in the network can maintain a sketch of the traffic flows into and out of the network during the measurement interval.

The ability to estimate entropy for origin-destination (OD) flows in a network can be highly beneficial in detecting and diagnosing anomalies in a network. Anomalies, such as distributed denial of service (DDos) attacks, which inundate a network with an exorbitant amount of traffic thereby slowing the network performance down, network failures, flash crowds, and scheduled maintenance tasks, such as route Internetwork Operating System (IOS) updates and customer migration, can result in network performance degradation and service disruption. Many of these events occur in a distributed manner in terms of the signatures (i.e. patterns formed by the anomalies in the network) and impact. Detecting these events and evaluating their impact on network services often requires monitoring traffic from a number of locations across the network. Changes in traffic distribution as a result of anomalies and/or scheduled maintenance may not be visible in a traditional volume matrix. However, the preferred embodiments can capture these events in real time by examining OD flows in the network. The approaches described herein enable accurate estimations of OD flow entropies fast enough for processing traffic at very high speed links (e.g. 10 million packets per second).

For a stream S of packets that contains n (transport-layer) flows with sizes (number of packets) $a_1, a_2, \ldots, a_n$, respectively, the empirical entropy H(S) is defined as follows:

$$-\sum_{i=1}^{n} \frac{a_i}{s} \log_2\left(\frac{a_i}{s}\right), \quad (1)$$

where $$s = \sum_{i=1}^{n} a_i$$

is the total number of packets in the stream S. To estimate the empirical entropy H(S) of a stream S, an estimate of a related quantity called entropy norm $\|S\|_H$ can be used. The entropy norm $\|S\|_H$ can be defined as $\Sigma_i a_i \ln(a_i)$, since H(S) can be rewritten as follows:

$$\begin{aligned} H(S) &= -\sum_i \frac{a_i}{s} \log_2\left(\frac{a_i}{s}\right), \quad (2) \\ &= \log_2(e)\left[\ln(s) - \frac{1}{s}\sum_i a_i \ln(a_i)\right], \\ &= \log_2(e)\left[\ln(s) - \frac{1}{s}\|S\|_H\right] \end{aligned}$$

To determine the entropy of OD flows, the entropy norm $\|S\|_H$ and the total number of packets s in a stream S are determined. The entropy of an OD flow stream $OD_{ij}$ between an ingress point i and an egress point j, is defined herein as the entropy of their intersection, i.e., $H(OD_{ij})=H(O_i \cap D_j)$. The total number of packets s in a stream S represents the volume of the OD flow and is typically an unknown quantity to be estimated separately. The preferred embodiments of the present invention include an approach to estimating the entropy norm $\|S\|_H = \|O_i \cap D_j\|_H$ and the total number of packets s to facilitate a computation of the entropy of OD flows $H(O_i \cap D_j)$. As discussed below the entropy norm $\|S\|_H$ can be approximated using an xln(x) approximation and an estimated Lp norm, which represents a distance measure of a vector, where p is preferably a number in the range of 0 to 2.

FIG. 1 shows an exemplary network 100 for which the entropy of OD flows can be determined. The network 100 can include provider edge (PE) routers 111-114, also referred to herein as edge routers, and provider routers (P-routers) 121-126, the implementation of each being generally know to those skilled in the art. Customers typically connect to the network 100 via the PE routers 111-114. For example, a customer router 141 can connect to the edge router 111 and a customer router 142 can connect to the edge router 114 to allow each customer router 141-142 to communicate with each other and with other customer routers connected to the network 100.

Streams S of packets can be transmitted over the network 100 from a PE router (i.e. an origin) to another PE router (i.e. a destination). Streams flowing into the network 100 via a PE router can represent an ingress flow and streams flowing out of the network via a PE router can represent an egress flow. These streams S of packets preferably include headers, where identical headers associate the packets with a flow. As the streams S of packets flow through the PE routers 111-114, the PE routers 111-114 preferably maintain sketches 150, including ingress sketches 152 for ingress flows and egress sketches 154 for egress flows. These sketches 150 can be used when determining the entropy between OD flows of the network 100.

In a preferred embodiment, a sketch is an array $\vec{Y}$ (i.e. Y[1 . . . l]) of floating point counters initially set to 0.0 at the beginning of a measurement interval. The critical operator for this approach is a set of p-stable hash functions $sh_i$, $i=1, \ldots, l$, implemented by a p-stable hashing unit 160. The p-stable hash functions $sh_i$ map a flow label packet identification (pkt.id) into a random value drawn from a stable distribution S(p) in such a way that the same flow label is preferably mapped to the same random value and that different flow labels are mapped to independent random values. In addition, these p-stable hash functions $sh_i$ are independent of one another.

Stable distributions are natural generalizations of the Gaussian distribution and generally take a fairly complicated form with four parameters. However, the preferred embodiments of the present invention use standard (normalized) cases that have three fixed parameters and one free parameter p, resulting in a restricted/standardized family denoted S(p), $p \in (0,2]$. The S(p)'s (e.g., S(0), S(1), S(2)) are uniquely characterized as follows:

Let X be a random variable that takes distribution S(p) with probability density function $f_{S(p)}(x)$. Then its characteristic function $E[e^{itX}]$ satisfies the following equation:

$$E[e^{itX}] \equiv \int_{-\infty}^{\infty} f_{s(p)}(x)(\cos(xt) + i \cdot \sin(xt)) = e^{-|t|^p}. \quad (3)$$

The existence and uniqueness of a probability density function satisfying the above equation is well known to those in the art. For any p, the probability density function $f_{s(p)}(x)$ of the distribution S(p) is continuous and infinitely differentiable on $(-\infty, +\infty)$. However, $f_{s(p)}(x)$ takes a closed form for three p values (p=2, 1, 0.5). S(p) with p=2 and 1 corresponds to two well-known examples of stable distributions to those skilled in the art. S(2) is the Gaussian distribution having a mean 0 and standard deviation 2, with probability density function $$f(x) = \frac{1}{2\sqrt{2\pi}} e^{-x^2/8}$$

and S(1) is the Cauchy distribution with the density function $$f(x) = \frac{1}{\pi} \frac{1}{1+x^2}.$$

For p values other than 2, 1, and 0.5, the distribution S(p) is generated using a simulation formula. Some properties of the stable distribution include stability and symmetry.

To implement the stable hash functions $sh_1, \ldots, sh_l$, a standard methodology for generating random variables with stable distributions $S(p)$ is provided through the following simulation formula:

$$X = \left[\frac{\sin(p\theta)}{\cos^{1/p}\theta}(\cos(\theta(1-p)))^{1/p-1}\right]\left[\left(\frac{1}{-\ln r}\right)^{1/p-1}\right], \quad (4)$$

where $\theta$ is chosen uniformly in $[-\pi/2, \pi/2]$ and $r$ is chosen uniformly in $[0, 1]$.

In one embodiment, the p-stable hash functions are implemented by fixing two uniform hash functions $uh_{j1}$ and $uh_{j2}$ that map a flow identifier pkt.id to a $\theta$ value uniformly distributed in $[-\pi/2, \pi/2]$, and an $r$ value uniformly distributed in $[0, 1]$, respectively. These two values are inserted into equation (4). However, computing equation (4) typically requires thousands of CPU cycles, and it is not generally practical to perform 40 such computations for each incoming packet.

In a preferred embodiment, the rate at which these stable hash functions (i.e., $sh'_j s$) are computed is increased by performing memory lookups into precomputed tables 170. The term in the first bracket of equation (4) is a function of $\theta$ and the term in the second bracket is a function of $r$. For implementing each $sh_j$, two uniform hash functions $uh_{j1}$ and $uh_{j1}$ are fixed that map a flow identifier pkt.id to two index values uniformly distributed in $[1 \ldots N_1]$ and $[1 \ldots N_2]$ respectively. Two lookup tables $T_1$ and $T_2$ are allocated that contain $N_1$ and $N_2$ entries respectively, and table entries (for both $T_1$ and $T_2$) contain l=20 blocks of 4 bytes each. $N_1*20$ i.i.d. random variables distributed as the term in the first bracket are precomputed and are filled into $T_1$ and $N_2*20$ i.i.d. random variables distributed as the term in the second bracket are computed and are filled into $T_2$. For each incoming packet, l=20 random values $T_1[uh_{j1}(pkt.id)][j]*T_2[uh_{j2}(pkt.id)][j]$, j=1, \ldots, 20, are returned as the computation result for $sh_1(pkt.id), sh_2(pkt.id), \ldots, sh_l(pkt.id)$. Since each sub-sketch requires two tables, a total of four tables are used. In one implementation, both $N_1$ and $N_2$ are set to fairly large values, such as 1M. Simulations show that stable distribution values generated based on this approach are generally indistinguishable from real stable distribution values. However, the described preferred implementation is very fast: two memory reads (4 bytes each) and a floating point multiplication for computing each $shj(pkt.id)$. Index values $uh_{j1}(pkt.id)$ and $uh_{j2}(pkt.id)$ are generated for estimating the $L_{1+a}$ norm (p=1+a) and can be reused for the lookup operations performed in estimating the $L_{1-a}$ norm (p=1-a), since all entries in these four tables are mutually independent.

Packets are processed with the sketch such that for each incoming packet, the packet's flow label is hashed by $sh_i$ and the result is added to the sketch $Y_i$. The values of counters in the sketch are analyzed. For example, the value of the counter for $Y_1$ can be analyzed as follows. Suppose that there are n flows with flow labels $id_1, \ldots, id_n$, and of sizes $a_1, \ldots, a_n$. The p-stable hash functions are denoted as follows: $sh_1(id_1)$ as $X_1$, $sh_1(id_2)$ as $X_2, \ldots, sh_1(id_n)$ as $X_n$. By the property of $sh_1$, we know that $X_1, \ldots, X_n$ are independent and identically distributed (i.i.d.) random variables with a standard distribution $S(p)$. After processing the stream, the counter value $Y_1$ becomes $a_1*X_1 + a_2*X_2 + \ldots + a_n*X_n$. Since each $X_i$ has distribution $S(p)$ and they are mutually independent, by the stability property, the counter value $Y_1$ is distributed as $(\Sigma_i |a_i|^p)^{1/p} X$, where $(\Sigma_i |a_i|^p)^{1/p}$ represents the Lp norm $\|S\|_p$ and $X$ is distributed as $S(p)$. Therefore, counters $Y_1, Y_2, \ldots, Y_l$ are i.i.d. draws from distribution $\|S\|_p X$. The data streaming algorithm is able to "modulate" the signal to be estimated, $(\Sigma_i |a_i|^p)^{1/p}$, into these counter values.

Figure 2:
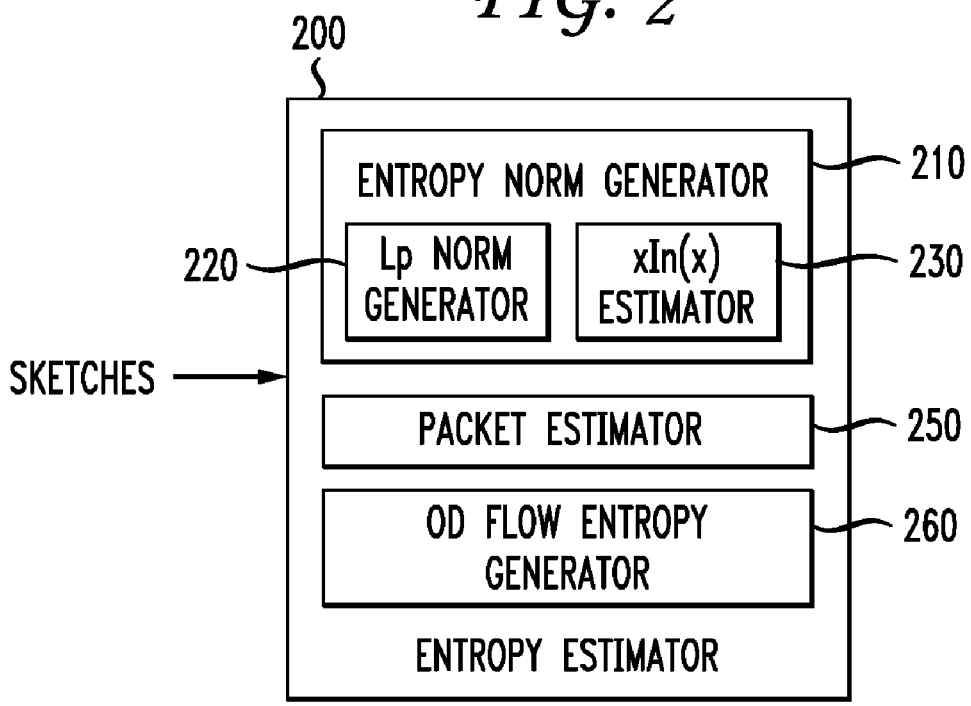
FIG. 2 is a block diagram of a preferred embodiment of an entropy estimator.

FIG. 2 shows a block diagram of a OD flow entropy estimator 200 (hereinafter "entropy estimator 200") in accordance with the preferred embodiments of the present invention. The estimator 200 can include an entropy norm generator 210, a filtering unit 240, a total number of packets estimator 250 (hereinafter "packet estimator 250"), and an OD flow entropy generator 260 (hereinafter "entropy generator 260"). The entropy norm $\|S\|_H = O_i \cap Dj|_H$ is estimated via the entropy norm generator 210 which in turn uses a Lp Norm generator 220 and an $x\ln(x)$ approximator 230. An estimate for the entropy norm $\|S\|_H$ can be calculated based on counter values in one or more sketches.

In a preferred embodiment, the entropy estimator 200 receives sketches for ingress and egress flows for the PE routers in the network 100. The theory of stable distributions is preferably used to estimate the distance measure $L_p$ norm $\|S\|_p$ of a stream S for values of p in $(0, 2]$. As discussed above, the $L_p$ norm $\|S\|_p$ for a stream S that contains n flows of sizes $a_1, \ldots, a_n$ can be defined as $(\Sigma_i |a_i|^p)^{1/p}$, which can be rewritten as follows:

$$\|S\|_p^p = \Sigma_i |a_i|^p. \quad (5)$$

$L_p$ norms for p values slightly above or below 1 play a crucial role in facilitating an estimation of OD flow.

To extract the Lp norm $\|S\|_p$ from the counter values in the sketches 150, the Lp norm generator 220 preferably implements a median estimator approach to determine the Lp norm $\|S\|_p$, which can be represented as follows:

$$\Lambda(\vec{Y}) \equiv \frac{\text{median}(|Y_1|, \ldots, |Y_l|)}{DMed_p}. \quad (6)$$

$\Lambda(.)$ is used to denote an operator that extracts $L_p$ norm estimates from sketches. Here $\text{median}(|Y_1|, \ldots, |Y_l|)$ denotes the sample median of the absolute values of the counter values and $DMed_p$ denotes the distribution median of $S^+(p)$. $S^+(p)$ is used herein to refer to the probability distribution of a random variable $|X|$, where $X$ has distribution $S(p)$ because its probability distribution function (p.d.f) is exactly twice the positive half of the p.d.f. for $S(p)$, due to the symmetry of $S(p)$. In this case, $DMed_p$ is the unique $x_0$ value such that $\Pr[|X| > x_0] = 0.5$, where $X$ has distribution $S(p)$. Due to the symmetry of $S(p)$, $DMed_p$ is exactly the three-quarter quantile of $S(p)$. Although there is no closed form for $DMed_p$ for most of the p values, it can be numerically calculated by simulation or other programs known to those skilled in the art.

Since $Y_1/\|S\|_p, \ldots, Y_l/\|S\|_p$ are i.i.d. random variables with distribution $S(p)$, taking absolute value gives us i.i.d. draws from $S^+(p)$. For large enough l, their median should be close to the distribution median of $S^+(p)$. Therefore, the median $(|Y_1|, \ldots, |Y_l|)$ is divided by the distribution median of $S^l(p)$ to get an estimator of $\|S\|_p$. The $L_p$ norm is preferably generated by the Lp norm generator 220 based on the property of the median, however, those skilled in the art will recognize that it is possible to construct estimators based on other quantities.

Since the entropy norm $\|S\|_H$ can be defined as $\Sigma_i a_i \ln(a_i)$ and $a_i$ can be estimated by the $L_p$ norm $\|S\|_p$, the $x\ln(x)$ approximator 230 can be used to estimate $x \ln(x)$ using a linear combination of a small number of functions in the family $\{x^p | p \in (0,2]\}$ to compute the entropy norm $\|S\|_H$ using the Lp norm $\|S\|_p$. The parameters $c_1, \ldots, c_k \in R$, where R represents real numbers, and $p_1, \ldots, p_k \in (0, 2]$ are provided such that xln(x) is approximated as follows:

$$x\ln(x) \approx \sum_{j=1}^{k} c_j * x^{pj}. \quad (7)$$

Figure 3:
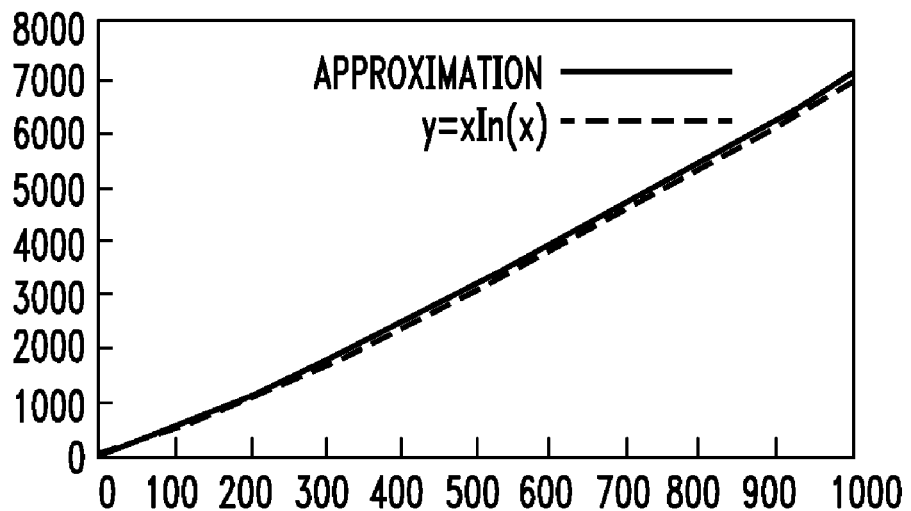
FIG. 3 shows a comparison between an xlnx approximation using the xlnx estimator and an actual xlnx computation.

Using this, the entropy norm $\|S\|_H$ of an OD flow stream S can be estimated as follows:

$$\sum_{j=1}^{k} c_j * \|S\|_{pj}^{pj}, \quad (8)$$

where Lp norm $\|S\|_{pj}$, j=1, . . . , k can be estimated using the sketch for stream intersection described herein. Using a linear combination of only two functions in the family, in the form of $$f(x) = \frac{1}{2\alpha}(x^{1+\alpha} - x^{1-\alpha}),$$

the xln(x) approximator 230 can approximate xln(x) closely for all x values in a large interval (e.g., [1,1000], [1, 5000], etc.). Here a is a tunable parameter that takes small values. For example, FIG. 3 shows how closely xln(x) can be approximated when a is 0.05 using $$\frac{1}{2\alpha}(x^{1+\alpha} - x^{1-\alpha})$$

within the interval [1, 1000]. In other words, if transport-layer flows in an OD flow stream S generally have less than 1000 packets, the entropy norm $\|S\|_H$ of the OD flow can be estimated as $10(\|S\|_{1.05}^{1.05} - \|S\|_{0.95}^{0.95})$. This "symmetry" of the exponents (1+α and 1−α) around 1 serves other important purposes described in more detail below. Using the Lp norm generator 220 and the xln(x) approximator 230, the entropy norm generator 210 can estimate the entropy norm $\|S\|_H$ as discussed above.

Still referring to FIG. 2, very large transport-layer flows (e.g., 10,000, 100,000, etc. of packets) inside an OD flow stream S are identified and filtered out of the entropy estimation with a "sample and hold" algorithm implemented by a stream filtering unit 240 using methods known to those skilled in the art. The contributions to the OD flow entropy of these very large transport-layer flows are computed separately.

To compute the entropy H from the entropy norm $\|S\|H$, the packet estimator 250 preferably estimates the total volume s of the OD flow stream S using the sketches for estimating Lp norms based on the formula $$\frac{1}{2\alpha}(x^{1+\alpha} - x^{1-\alpha}),$$

where α is a small number such as 0.05. For this case, the function x can be approximated by $$\frac{(x^{1+\alpha} + x^{1-\alpha})}{2}$$

and therefore the OD flow volume (i.e., the $L_1$ norm) can be approximated by the average of $\|S\|_{1+\alpha}^{1+\alpha}$ and $\|S\|_{1-\alpha}^{1-\alpha}$ calculated from the OD flow stream S. Therefore, the sketch data structure described herein allows the estimated $L_1$ norm for the total number of packets s and entropy norm $\|S\|_H$ to be computed.

The entropy generator 260 can use the entropy norm $\|S\|_H$ generated by the entropy norm generator 210 and the total number of packets s estimated using the packet estimator 250 to estimate the entropy of OD flows in the network 100. The entropy generator 260 can estimate the entropy of OD flows based on equation (2).

FIG. 4 shows a flowchart for estimating the entropy using the entropy estimator 200. A sketch is created that represents packets for a flow (step 400). Any flows that exceed a specified size can be filtered out by the filtering unit 240 to be analyzed separated. The entropy estimator 200 receives the sketch and extracts an estimate of the Lp norm $\|S\|_p$ from the sketch using the Lp norm generator 220 (step 405). The xln(x) aproximator 230 generates the entropy norm $\|S\|_H$ based on the computed Lp norms (step 410). A total number of packets s in a stream is determined using the packet estimator 250 (step 415). Subsequently, the entropy H(S) is calculated based on equation (2) using the entropy norm $\|S\|_H$ and the total number of packets s (step 420).

FIG. 5 shows a flowchart for generating sketches 150 and estimating the Lp norm $\|S\|_p$ from the sketches 150 in more detail. First a sketch is created as an array Y[1, . . . ,l] and the counters of the sketch are initialized to zero (step 500). P-stable hash functions $sh_1$ through $sh_l$ are fixed (step 505). As packets sequentially pass through a origin or destination PE router, the counter values of the sketch are incremented using the p-stable hash function based on the packet ID of the incoming packet (step 510). Once the sketch is computed for a given duration, the Lp norm $\|S\|_p$ is extracted using equation (6) (step 515).

An analysis of the performance of the estimator for the Lp norm $\|S\|_p$ can be based on a (ε,δ) bound for p=1.

Theorem 1. Let $\vec{x} = (x_1, \ldots x_l)$ be i.i.d. samples form S(1), $$l = 8\left(\ln 2 + \ln\frac{1}{\delta}\right)\bigg/\varepsilon^2, \varepsilon < 0.2,$$

the $DMed_1 = 1$, and $Pr[median(|X_1|, \ldots, |X_l|) \in [1-\varepsilon, 1+\varepsilon]] > 1-\delta$. Thus (1) gives an (ε, δ) estimator for p=1.

For example, when p=1, δ=0.05, and ε=0.1, then l=2951. This is a very loose bound in the sense that we need a very large l. Thus an asymptotic normality of the median for some approximate analysis can be used as follows.

Theorem 2.

$$\text{Let } f = f_{S+(p)}, m = DMed_p, l = \left(\frac{z_{\delta/2}}{2mf(m)\varepsilon}\right)^2, \text{ then} \quad (1)$$

gives an estimator with asymptotic (ε, δ) bound. $z_a$ is the number such that for standard normal distribution Z we have $Pr[Z>z_a]=a$.

The result for this is in the same order of $O(1/\varepsilon^2)$ as the above result, but the coefficient is much smaller as shown below. For example, when p=1, δ=0.05, and ε=0.1, then m=1, f(m)=1/π, $z_{\delta/2}$=2, and l=986 as compared with l=2951 from above.

For p=1.05, m=0.9938, f(m)=0.3324, l=916. For p=0.95, m=1.0078, f(m)=0.3030, and l=1072. Our simulations show that these are quite accurate bounds. We can see that mf(m)

does not change much in a small neighborhood of p=1. Since we are only interested in p in a small neighborhood of 1, for rough arguments we may use m$f$(m) at p=1, which is $1/\pi$.

As discussed above, the entropy of a stream of flows is computed based on approximating the entropy function xln (x) by a linear combination of expressions $x^p$, p $\in$ (0, 2]. This approximation can be performed up to an arbitrary relative error F. To make the formula simpler natural logarithm ln x instead of $\log_2$ x, noting that changing the base is simply a matter of multiplying by the appropriate constant, thus having no effect on relative error.

Theorem 3. For any N>1, $\epsilon$>0, there exists a $\in$ (0, 1), c=½ a $\in$ $O(\ln(N)/\epsilon^{1/2})$, such that $f(x)=c(x^{1+a}x^{1-a})$ approximates the entropy function xlnx for x $\in$ (1, N] within relative error bound $\epsilon$, i.e., $$\left|\frac{f(x) - x\ln x}{x\ln x}\right| \leq \varepsilon,$$

which can be proved using the Taylor expansion.

An estimate for the entropy norm $\|S\|_H$ can be computed using the xln(x) estimator 230 and the Lp norm estimator 220. For example, if $\alpha$ and c in Theorem 1 to get relative error bound $\epsilon_0$ on [1,N] and if 1 from Theorem 1 for p=1±α is chosen to achieve an asymptotic ($\epsilon$, $\delta$) error bound, then for p=1+α there are sketches $\vec{Y}$ and for p=1−α there are sketches $\vec{Z}$. The entropy norm estimator 210 estimates the entropy norm $\|S\|_H$ the entropy norm as follows:

$$\|\hat{S}\|n = \frac{1}{2\alpha}\left(\Lambda(\vec{Y})^{1+\alpha} - \Lambda(\vec{Z})^{1-\alpha}\right) \quad (9)$$

The error of this estimation is based on an assumption that $a_i \leq N$. The estimate of the entropy norm $\|S\|_H$ is within a relative error of roughly $2\lambda c\epsilon + \lambda_0 \epsilon_0$ with probability of roughly 1−2$\delta$, $$c = \frac{1}{2a},$$

$$\lambda_0 = |c(\|S\|_{1+a}^{1+a} - \|S\|_{1+a}^{1+a})/\|S\|_H - 1|/\varepsilon_0 \leq 1,$$

$$\lambda - \|S\|_{1+a}^{1+a}/\|S\|_H,$$

and $\lambda$ is typically less than 1.

For example, if N=1024, a=0.05, $\epsilon$=0.001, $\delta$=0.05, then $\epsilon_0$=0.023, l≈$10^5$. Assuming only that $\lambda$=$\lambda_0$=1, then (2c$\epsilon$+$\epsilon_0$)≈ 0.04, i.e. entropy norm $\|S\|_H$ can be approximated within 4% error with 90% probability using $10^5$ samples. Assuming $\lambda$=0.5, then $\epsilon$ can be increased to 0.002, and l can be decreased to approximately 2.5×$10^4$; thereby achieving 4% error.

Using the same assumptions as above with a more aggressive error calculation, equation ( ) estimates the entropy norm $\|S\|_H$ within a relative error of roughly $\sqrt{2}c\lambda\epsilon + \lambda_0\epsilon_0$ with probability roughly 1-$\delta$. As such, having l≈1.25×$10^4$ achieves the 4% error with probability 95%.

As discussed above, to compute the actual entropy $$H = \log_2 s - \frac{1}{s}\sum_i a_i \log_2 a_i,$$

the volume of the traffic s or $\|S\|_1$ is first computed using the packet estimator 240. Since an objective of the preferred embodiments of the present invention is to calculate the entropy of OD pairs in a network, a traffic matrix for the network is computed. This is accomplished using the same sketches that are maintained. A single stream is discussed for this example, however, this is extended to a distributed case below for multiple streams.

Theorem 4. Let a, N, and $\epsilon$ be as in Theorem 1. Then, the approximation $(x^{1+\alpha}+x^{1-\alpha})/2$ approximates the function $f(x)=x$ with relative error at most $3^\epsilon$. This approximation holds for all counts in the range [1,N] and an elephant sketch created by the filtering unit 240 to capture flows with size strictly greater than N.

The packet estimator 250 estimates the total number of packets s or $\|S\|_1$ as follows:

$$(\|\hat{S}\|)_1 \equiv \frac{1}{2}\left(\Lambda(\vec{Y})^{1+\alpha} + \Lambda(\vec{Z})^{1-\alpha}\right). \quad (10)$$

Equation (10) estimates $\|S\|_1$ roughly within relative error bound e+3$\lambda'_0\epsilon_0$ with probability 1-2$\delta$, where $\lambda'_0$= $|(\|S\|_{1+\alpha}^{1+\alpha}+\|S\|_{1-\alpha}^{1-\alpha})/\|S\|_1 -1|/3\epsilon_0 \leq 1$. An aggressive error estimate provides an error bound of roughly $$\frac{1}{\sqrt{2}} \epsilon + 3\lambda'_\theta \epsilon_0$$

with probability 1-$\delta$.

The above discussion can be extended to estimating entropy of OD flow pairs in the network based on the IMP property of the sketches using sketches at ingress nodes and egress nodes to estimate the Lp norm of the OD flows. For a given OD flow pair in a network, sketches for the ingress (origin) node and egress (destination) node of the pair are used to perform an estimation of the entropy for that OD pair. Subsequently, another OD pair can be selected and the appropriate sketches can be used to estimate the entropy of that OD pair. In the discussion that follows, the ingress stream is referred to as O and the egress stream is referred to as D. As discussed above, the entropy of OD pairs can be defined by the intersection between O and D (O∩D). Estimating the Lp norms for O∩D, p=1+α, using the Lp norm estimator 220 allows for estimating the entropy of OD pairs using the approach discussed above. The sketches at ingress nodes and egress nodes are preferably implemented with an identical number of counters l and an identical set of p-stable hash functions.

With a slight abuse of notation, $\vec{O}$ denotes a sketch for an ingress node, and $\vec{D}$ denotes a sketch for a corresponding egress node. $\vec{O}+\vec{D}$ and $\vec{O}-\vec{D}$ are the component-wise addition and difference of $\vec{O}$ and $\vec{D}$, respectively, since the same values of l are used for the sketches.

The Lp norm estimator 220 for $\|O \cap D\|_p$; $\|\widehat{O \cap D}\|_p$, can be defined as either $$\Lambda(\vec{O}, \vec{D}) \equiv \left(\frac{\Lambda(\vec{O})^p + \Lambda(\vec{D})^p - \Lambda(\vec{O}-\vec{D})^p}{2}\right)^{1/p} \quad (11)$$

or $$\Lambda'(\vec{O}, \vec{D}) \equiv \left(\frac{\Lambda(\vec{O}+\vec{D})^p - \Lambda(\vec{O}-\vec{D})^p}{2^p}\right)^{s/p}, \quad (12)$$

which are an extension of equation (6) to accommodate an OD pair.

The equations (11) and (12) described above provide good estimators for the Lp norm $\|O \cap D\|_p$. The Lp norm estimator 220 preferably uses two copies of one of the above equations (11) or (12), one for $p_1$=1−α and one for $p_2$=1+α. Once the Lp norms are computed, the xln(x) estimator 230 is used by the entropy norm estimator 210 to compute a the entropy norm, which can be used by the entropy generator 260 to approximate the entropy between some or all of the OD pairs (i.e. ingress and egress node pairs) in the network.

The flows that enter through the ingress node or exit through the egress nodes can be portioned as follows:

A=O−D=flows that enter at ingress but do not exit through the egress

B=O∩D=flows that enter at ingress and exit through the egress

C=D−O=flows that do not enter at ingress but exit through the egress

Based on equation (6), $\Lambda(\vec{O})$ is an estimator for entropy norm $\|O\|_p$ and $\Lambda(\vec{O})^p$ is an estimator for $\|O\|_p^p = \|A \cup B\|_p^p = \|A\|_p^p + \|B\|_p^p$. Similarly $\Lambda(\vec{D})^p$ is an estimator for $\|B\|_p^p + \|C\|_p^p$.

The sketch $\vec{O} + \vec{D}$ holds the contributions of the flows in A, B and C, but with every packet from B contributing twice. B(2) is used to denote all the flows in B with packet counts doubled. Then $\Lambda(\vec{O} + \vec{D})^p$ is an estimator for $\|A \cup B^{(2)} \cup C\|_p^p = \|A\|_p^p + 2^p\|B\|_p^p + \|C\|_p^p$, since the ingress and egress nodes are using the same sketch settings, as discussed above.

The sketch $\vec{O} + \vec{D}$ exactly cancels out the contributions from all the flows in B, and leaves the contributions of flows from A and the negative of the contributions of flows from C. $C^{(-1)}$ is used to denote all the flows in C with packet counts multiplied by −1. Then $\Lambda(\vec{O} - \vec{D})^p$ is an estimator of $\|A \cup C^{(-1)}\|_p^p = \|A\|_p^p + \|C^{(-1)}\|_p^p = \|A\|_p^p \|C\|_p^p$. To sum up:

$\Lambda(\vec{O})^p$ estimates $\|A\|_p^p + \|B\|_p^p$ $\Lambda(\vec{D})^p$ estimates $\|B\|_p^p + \|C\|_p^p$ $\Lambda(\vec{O} + \vec{D})^p$ estimates $\|A\|_p^p + 2^p\|B\|_p^p + \|C\|_p^p$ $\Lambda(\vec{O} - \vec{D})^p$ estimates $\|A\|_p^p + \|C\|_p^p$.

From the above, it can be determined that both equation (11) and equation (12) are reasonable estimators for $\|B\|_p$, i.e. $\|O \cap D\|_p$.

Suppose we have chosen proper l such that equation (11) is roughly an (ε, δ) estimator. Suppose $\|O \cap D\|_p^p = r_1\|O\|_p^p$, and $\|O \cap D\|_p^p = r_2\|D\|_p^p$. Then equation (11) raised to the power p estimates $\|O \cap D\|_p^p$ roughly within relative error bound $$\left(\frac{1}{r_1} + \frac{1}{r_2} - 1\right)\epsilon$$

with probability at least 1−3δ. Similarly, equation (12) raised to the power p estimates $\|O \cap D\|_p^p$ roughly within relative error bound $$2^{1-p}\left(\frac{1}{r_1} + \frac{1}{r_2} + 2^{p-r} - 2\right)\epsilon \approx \left(\frac{1}{r_1} + \frac{1}{r_2} - 1\right)\epsilon$$

with probability at least 1−2δ. This gives a very loose rough upper bound on the relative error. The ratios $r_1$ and $r_2$ are related to, but not identical to, the ratio of OD flow traffic against the total traffic at the ingress and egress points.

To calculate OD flow entropy, $\Lambda(\vec{Y})$ is replaced in equation (6) and (9) with $\Lambda(\vec{O}, \vec{D})$ where $\vec{O}$ and $\vec{D}$ are $L_{1+\alpha}$ sketches, and $\Lambda(\vec{Z})$ is similarly replaced.

Incoming packets preferably trigger increments to all l counters for estimating one $L_p$ norm, and the entropy estimator 200 uses two separate $L_p$ norms computations. Such a large l is generally unacceptable for networking applications. For high-speed links, where each packet has tens of nanoseconds to process, it is generally not feasible to increment that many counters per packet, even if they are all in fast SRAM.

A methodology of bucketing is used to resolve feasibility concerns. With bucketing, a sketch becomes a two-dimensional array M[1 ... k][1 ... l]. For incoming packets, flow labels are hashed using a uniform hash, function uh, and the result uh(pkt.id) is the index of the bucket at which the packet should be processed. Then the counters are incremented M[uh(pkt.id)][1 ... l] an a similar manner as discussed above with respect to FIG. 5. Finally, the $L_p$ norm estimations are added up from all these buckets to obtain a final estimate.

Bucketing (i.e., with k buckets instead of 1) can reduce the standard deviation of the estimation of $L_p$ norms by a factor slightly less than $\sqrt{k}$, provided that the number of flows is much larger than the number of buckets k. A decrease in l can be compensated by an increase in k by a slightly larger factor. In a preferred implementation, the number of buckets k is typically on the order of 10,000. Such a large bucket size allows l to shrink to a small number such as 20 to achieve the same (or even better) estimation accuracy. Even on very high-speed links (e.g., 10M packets per second), a few tens of memory accesses per packet can be accommodated.

$B_i$ is used to denote all the flows hashed to the $i^{th}$ bucket, and $\|B_i\|_p$ to denote the $L_p$ norm of the flows in the $i^{th}$ bucket, similar to the definition of Lp norm $\|S\|_p$ before ($\|S\|_p^p = \Sigma_i \|B_i\|_p^p$). Let $M_i$ be the $i^{th}$ row vector of the sketch. $\Lambda(M_i)$ as defined in equation (6) is an estimator of $\|B_i\|_p$, so naturally the estimator for $\|S\|_p$ is:

$$\left(\|S\|_p^p = \left[\sum_{i=1}^{k}(\Lambda(M_i))^p\right]^{1/p}\right) \quad (13)$$

In an ideal case of even distribution of flows into buckets, and all $\|B_i\|_p^p$ are the same, then $\|S\|_p^p = k\|B_i\|_p^p$. Consider p=1, then the estimator $\Lambda(M_i)$ is roughly Gaussian with mean $\|B_i\|_p$ and standard deviation $(\frac{1}{2}m f(m)\sqrt{l})\|B_i\|_1$. By the Central Limit Theorem, $$\Lambda(M) = \sum_{i=1}^{k}\Lambda(M_i)$$

is asymptotically Gaussian, and its standard deviation is roughly $\sqrt{k}(\frac{1}{2}m f(m)\sqrt{l})\|B_1\|_1 = (\frac{1}{2}m f(m)\sqrt{lk})\|S\|_1$. If equation (6) was used without bucketing, the standard deviation would be $(\frac{1}{2}m f(m)\sqrt{l})\|S\|_1$. So lk is performing the same role as l did when bucketing is not used, or in other words, k buckets reduces standard error roughly by a factor of $\sqrt{k}$.

Generally there is not even distribution of flows into various buckets. However, when the number of flows is far larger than the number of buckets, which will be the case with parameter settings and intended workload of the preferred embodiments of the present invention, the factor of error reduction is only slightly less than $\sqrt{k}$. When k is increased to be on the same order of the number of flows, however, the factor of error reduction typically no longer scale as $\sqrt{k}$ since there can be many empty buckets that do not contribute to the reduction of estimation error, and since there can be a more uneven distribution of flows into buckets. Therefore, when l is fixed, the estimation error cannot generally be brought down arbitrarily close to 0 by increasing k arbitrarily.

Another issue is the bias of median estimator in equation (6), that is, the expected value of the sample median of l samples is typically not equal to the distribution median DMedp. When buckets are not implemented, the asymptotic normality implies that the bias is much smaller than the standard error, so we could ignore the issue. However, when buckets are implement (e.g., k buckets) to reduce the standard error by a factor of $\sqrt{k}$, the bias becomes significant. Let $EMed_{p,l}$ denote the expected value of the median of l samples from distribution $S^+(p)$. So the estimator for $\|B_i\mu_p$ is redefined as follows $$\vec{\Lambda}(M_i) \equiv \frac{\text{median}(|M[i][1]|, \ldots, |M[i][l]|)}{EMed_{p,l}}. \tag{14}$$

Equation (14) replaces $\Lambda(M_i)$ in (13) and gives Lp norm estimation used be the Lp norm estimator 220 when buckets are used. Note that equation (14) is an unbiased estimator, but equation (13) still may be biased.

It can be assumed that M and N are Lp sketches with buckets at ingress node O and egress node D respectively, and the two sketches use the same settings. $\vec{O}$ and $\vec{D}$ in equations (11) and (12) can be replaced with M and N, which as discussed above provide estimators of OD flow $L_p$ norms.

$EMed_{p,l}$ can be numerically calculated using the p.d.f. formula for order statistics when $fs_{(p)}$ has closed form. Or it can be derived via simulation. $VEMed_{p,l}$ denotes the variance of the sample median of l samples. For example, when p=1, l=20, then $EMed_{1,20}$=1.069, $VMed_{1,20}$=0.149, so the standard deviation is 0.386. The distribution median is $DMed_1$=1, so we can see the bias 0.069 is much smaller than the standard deviation 0.386. Also the asymptotic standard deviation is 0.351, which is close to the actual value of 0.385.

Figure 6:
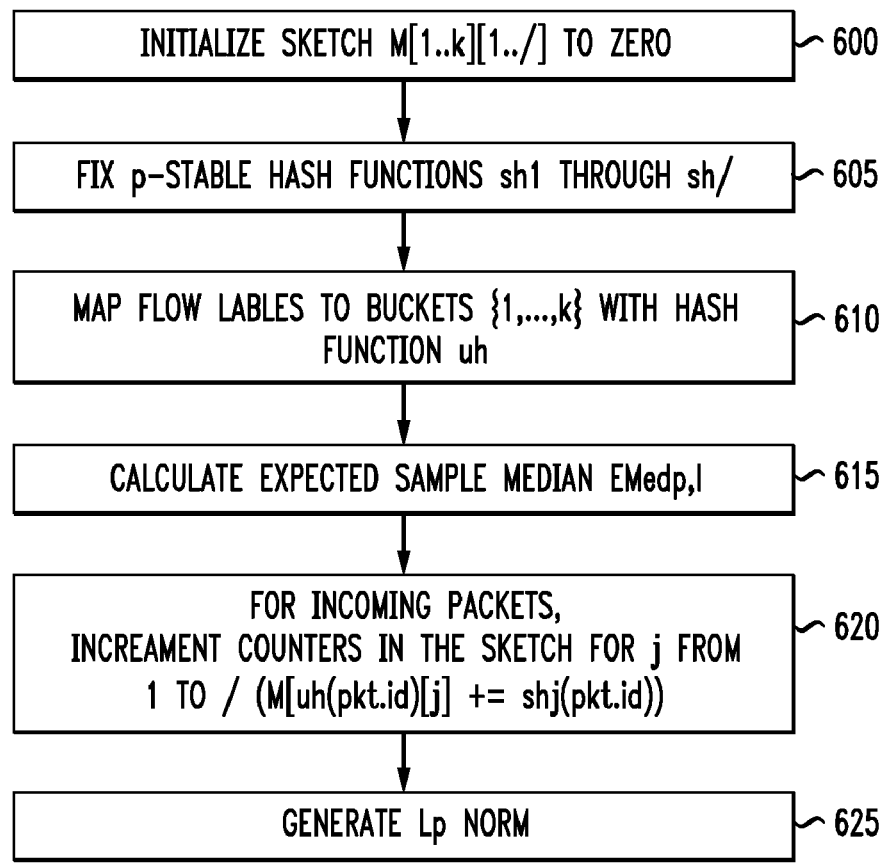
FIG. 6 is flowchart showing a computation of the Lp norm using the bucketing technique in accordance with a preferred embodiment of the present invention

FIG. 6 is a flowchart showing computation of the Lp norm using the bucketing technique in accordance with a preferred embodiment of the present invention. A sketch M[1 . . . k] [1 . . . l] is initialized to zero (step 600). The p-stable hash functions $sh_1$ through $sh_l$ are fixed (step 605). The hash function uh maps flow labels to buckets {1, . . . , k} (step 610) and the expected sample median $EMed_{p,l}$ is calculated (step 615). For incoming packets (pkt), increment counters in the sketch for j from 1 to l(M[uh(pkt.id)][j]+=$sh_j$(pkt.id)) (step 620). Finally, the Lp norm is generated based on equation 14 (step 625).

Figure 7:
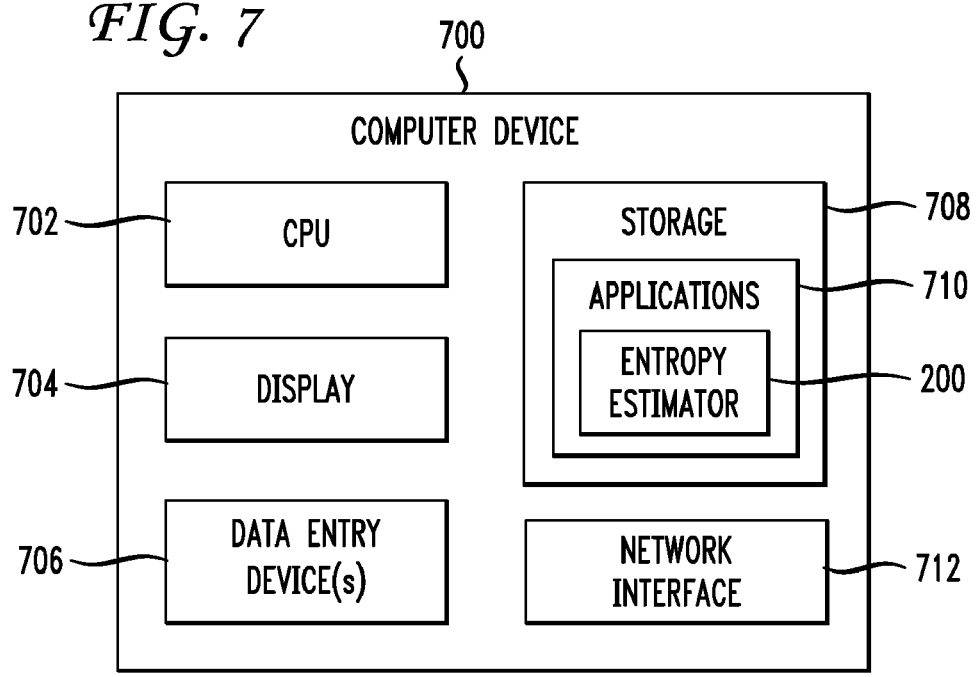
FIG. 7 shows an exemplary computing device for implementing entropy estimation of OD flows in a network.

FIG. 7 depicts an exemplary computing device 700 for implementing entropy estimation of OD flows in a network in accordance with the preferred embodiments of the present invention. The computing device 700 can be a mainframe, personal computer (PC), laptop computer, workstation, handheld device, such as a PDA, or the like. In the illustrated embodiment, the computing device 700 includes a central processing unit (CPU) 702 and preferably a display device 704. The display device 704 enables the computing device 700 to communicate directly with a user through a visual display. The computing device 700 can further include data entry device(s) 706, such as a keyboard, touch screen, and/or mouse.

The computing device 700 can include storage 708 for storing data, such as sketches, Lp norms $\|S\|_p$, total number of packets s, entropy norms $\|S\|_H$, entropy, etc., and instructions, such as instruction for computing the Lp norms $\|S\|_p$, total number of packets s, entropy norms $\|S\|_H$, entropy, etc. The storage 708 can include such technologies as a floppy drive, hard drive, tape drive, Flash drive, optical drive, read only memory (ROM), random access memory (RAM), and the like.

Applications 710, such as the entropy estimator 200 or components thereof for performing the process described above, can be resident in the storage 708 or may be distributed among multiple computing devices. The storage 708 can be local or remote to the computing device 700 and can include a database 720 to which the computing device 700 can connect via the network 100 or another network. The computing device 700 includes a network interface 712 for communicating over the network 100 to query and receive trace information from the nodes of the network 100 and/or to retrieve or store information in the database 720. The CPU 702 operates to run the application in storage 708 by performing instructions therein and storing data resulting from the performed instructions, which may be depicted via the display 704 or by other mechanisms known to those skilled in the art, such a print out from a printer.

The preferred embodiments can work with high link speeds of up to 10 million packets per second using commodity CPU/memory at a reasonable cost. As discussed above, two sub-sketches for estimating the $L_{1+a}$ and the $L_{1-a}$ norms respectively, each of which preferably consists of k*l real-valued counters. The number of counters per bucket l is set to 20 in a preferred implementation. Since the sketches can implemented using inexpensive high-throughput DRAM, the number of buckets k can be very large (say up to millions).

Each incoming packet, l=20 counters are incremented per sketch (two sub-sketches). Single-precision real number counters (4 bytes each) are used to minimize memory I/O (space not an issue), as 7 decimal digits of precision is accurate enough for the preferred embodiments. This involves 320 bytes of memory reads or writes, since each counter increment preferably involves a memory read and a memory write. Generating realizations of p-stable distributions from two pre-computed tables in order to compute sh preferably involves another 320 bytes of memory reads. In total, each incoming packet preferably triggers 640 bytes of memory reads/writes. Using commodity RDRAM DIMM 6400, the sketches of the preferred embodiments can deliver a throughput of 10 million packets per second.

The sketches can be implemented using RDRAM DIMM 6400 (named after its 6400 MB/s sustained throughput for burst accesses), except that the elephant detection module is preferably implemented using a small amount of SRAM. RDRAM can deliver a very high throughput for read/write in burst mode (a series of accesses to consecutive memory locations). Since 640 bytes of memory accesses triggered by each incoming packet consist of 4 large contiguous blocks of 160 bytes each, the 6400 MB/s through-put provided by RDRAM DIMM 6400 can be used efficiently. Memory space/consumption is generally not a concern, since the sketches are implemented using DRAM. Even if we need millions of buckets, only hundreds of MBs are consumed.

A packet monitor was deployed on a 1 Gbit/second ingress link from a data center into a large tier-1 ISP backbone network. The data center hosts tens of thousands of Web sites as well as servers providing a wide range of services such as multimedia, mail, etc. The link monitored is one of multiple links connecting this data center to the Internet. All the traffic carried by this link enters the ISP backbone network at the same ingress router. For each observed packet, the monitor captured its IP header fields as well as UDP/TCP and ICMP information for defining flows.

Five-minute traces and a one-hour trace were collected. A routing table dumped at the ingress router was used to determine the egress router for each packet, thus determining the OD flows to each possible egress router. Because the packet monitoring capability implemented to gather data was not available at egress routers, synthetic traffic traces are generated at egress routers so that they contain corresponding OD flows observed at the ingress router and the flow size distribution at egress routers are dictated so that they preferably match the flow size distribution of the ingress trace.

The following two traces are used to illustrate results for the entropy estimation approach described herein.

Trace 1: A one hour trace collected that contains 0.4 billion packets which belong to 1.8 million flows. We chose one egress router so that the traffic between the origin and destination comprised of 5% of the total traffic arriving at the ingress router.

Trace 2: A five minute trace that is similar to Trace 1, where traffic between the origin and our chosen egress router comprised of 5% of the total traffic arriving at the ingress router. The traffic in this trace is purposely chosen as being a subset of the traffic for Trace 1 so that we can directly compare the performance of entropy estimator 200 for five minutes and one hour intervals.

For each trace, the experiment is repeated 1000 times with independently generated sketch data structures for which the cumulative density function of the relative error are computed. Unless stated otherwise, the parameters we used for each experiment were: number of buckets k=50,000, number of registers in each bucket l=20, sample and hold sampling rate P=0.001, and one million entries in each lookup table.

An elephant flow (for which the contribution to the entropy are computed separately) is defined to be any flow with at least N=1000 packets in this illustrative implementation. $\alpha=0.05$ is used, which satisfies the constraint $\alpha<1/\ln N$. Hence, at every ingress and egress point we have a pair of sketches computing the $L_{1.05}$ and $L_{0.95}$ norms of the traffic.

Figure 8:
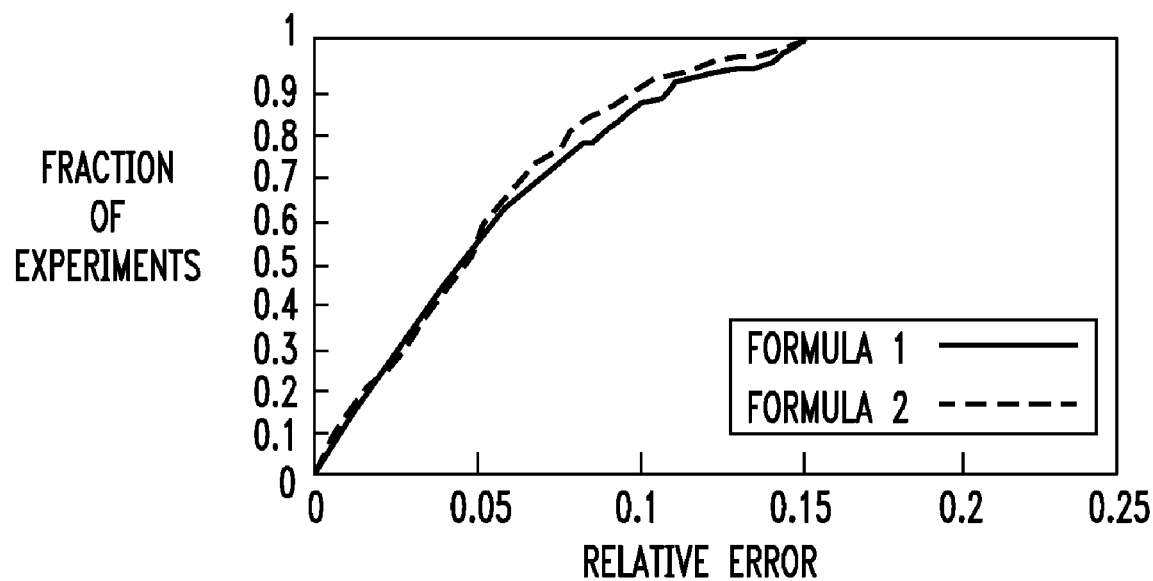
FIG. 8 is a cumulative density plot showing an error of the entropy estimator 200 for a trace.

Results from equations (11) and (12) are compared using the sketches created for the above traces. The cumulative density plots for the error of the entropy estimator 200 using equations (11) and (12) for Trace 1 are given in FIG. 8. Implementations using both equations have reasonably small and comparable error values. This also holds on all five minute traces and hence we fix and use equation (11) for the remaining evaluation.

Figure 9:
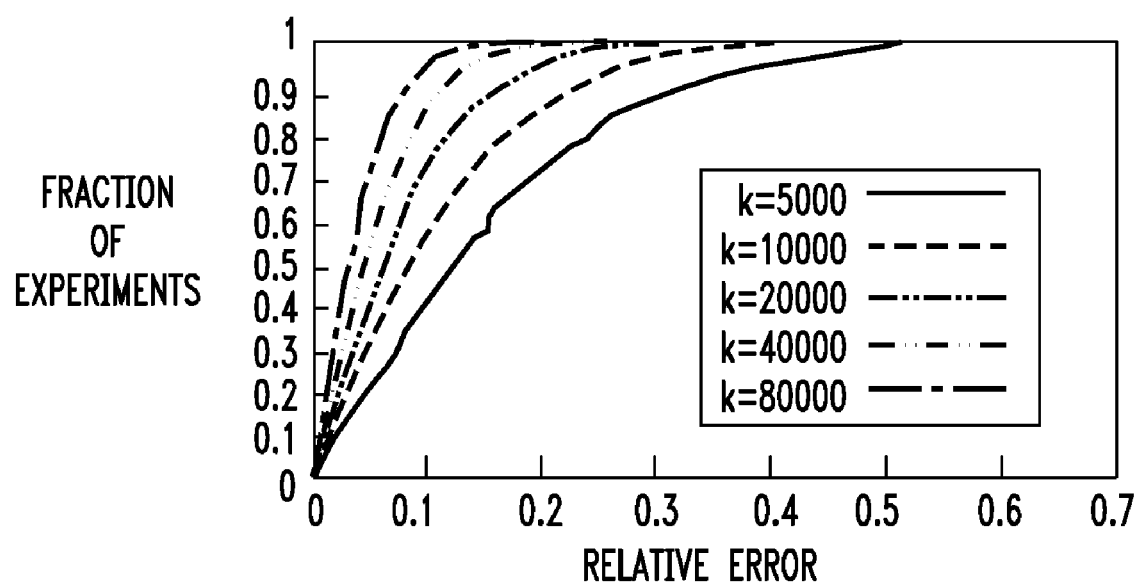
FIG. 9 shows the effect of increases a number of buckets used when creating a sketch.

The effect of varying the number of buckets on the performance of the entropy estimator is studied. Keeping all other parameters fixed at reasonable values, the number of buckets is varied between k=5000 and k=80000, with increasing factors of two. FIG. 9 shows the results of Trace 2. It is shown that increasing the number of buckets increases the accuracy (as expected), but with diminishing returns.

Figure 10:
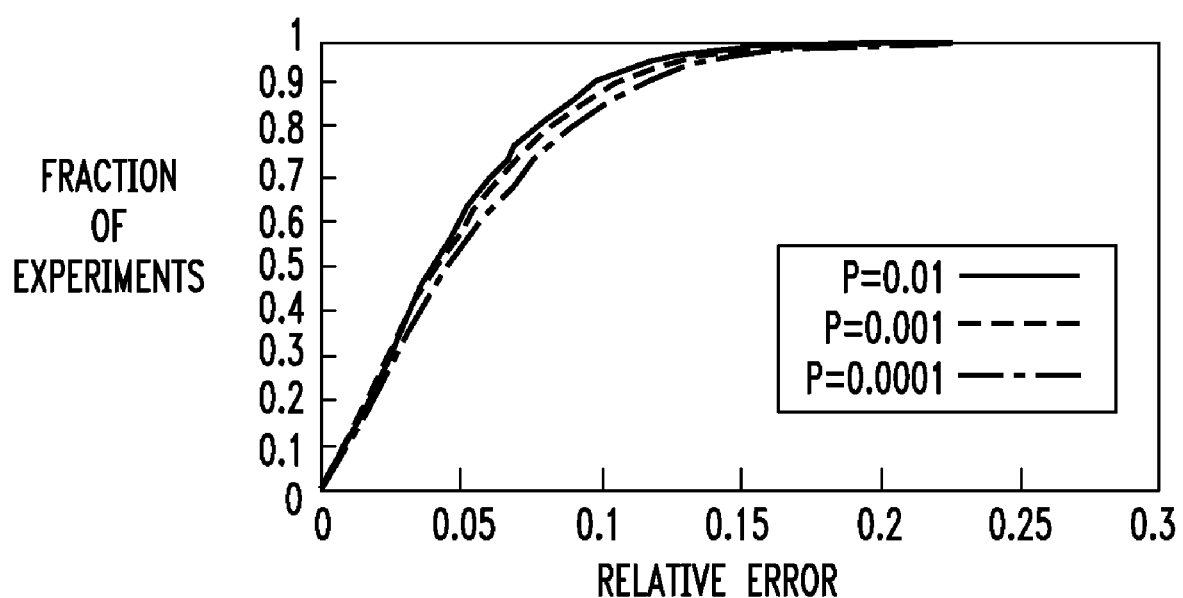
FIG. 10 shows that the elephant detection mechanism allows good overall performance using the entropy estimator of the preferred embodiments of the present invention.

As discussed above, the entropy computation large (elephant) flows are separated by means of a sample and hold technique. By varying the sampling rate the probability with which flows that are above our elephant threshold (i.e., flows of size greater than 1000) are sampled can increase or decrease. It was shown that the sampling rate did not affect the performance of our algorithm significantly. FIG. 10 shows that, even with a small sampling rate (e.g., 1 in 1000), the elephant detection mechanism allows good overall performance for our algorithm.

Figure 11:
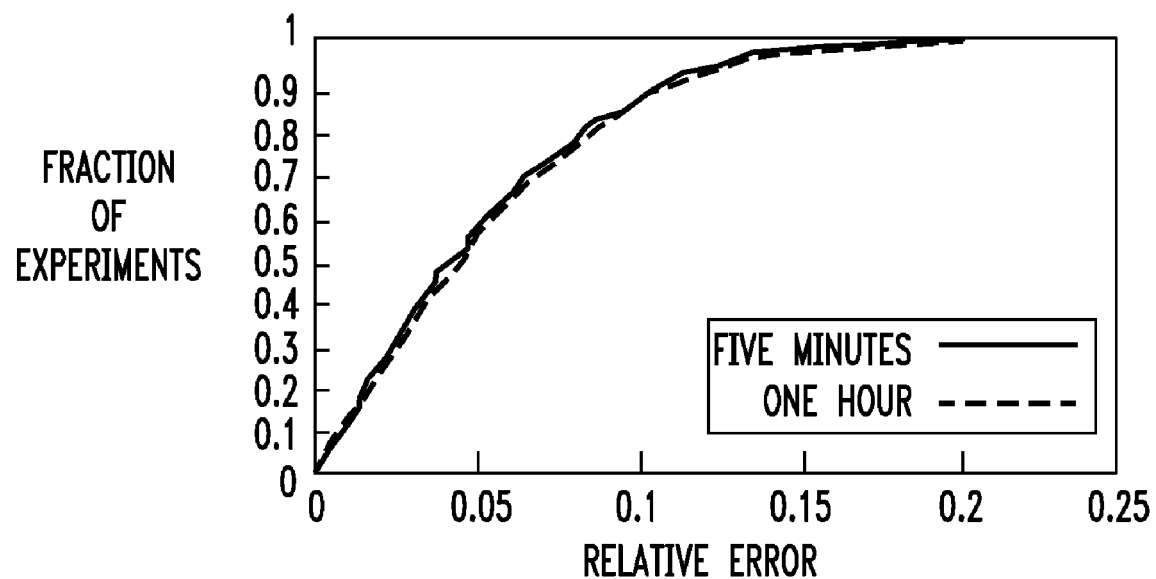
FIG. 11 compares the cumulative density plots of the error for between two traces having different measurement intervals.

FIG. 11 compares the cumulative density plots of the error for the five minute, Trace 2, and the one hour, Trace 1, which have the same origin and destination nodes and similar traffic distributions. Even though there is an order of magnitude difference in the size of these traces, not only does the error remain comparable, but also does the distribution of the error. Different trace sizes show that the entropy estimator 200 is robust to changes in the size of traces as long as the fraction of cross-traffic is held constant.

Figure 12:
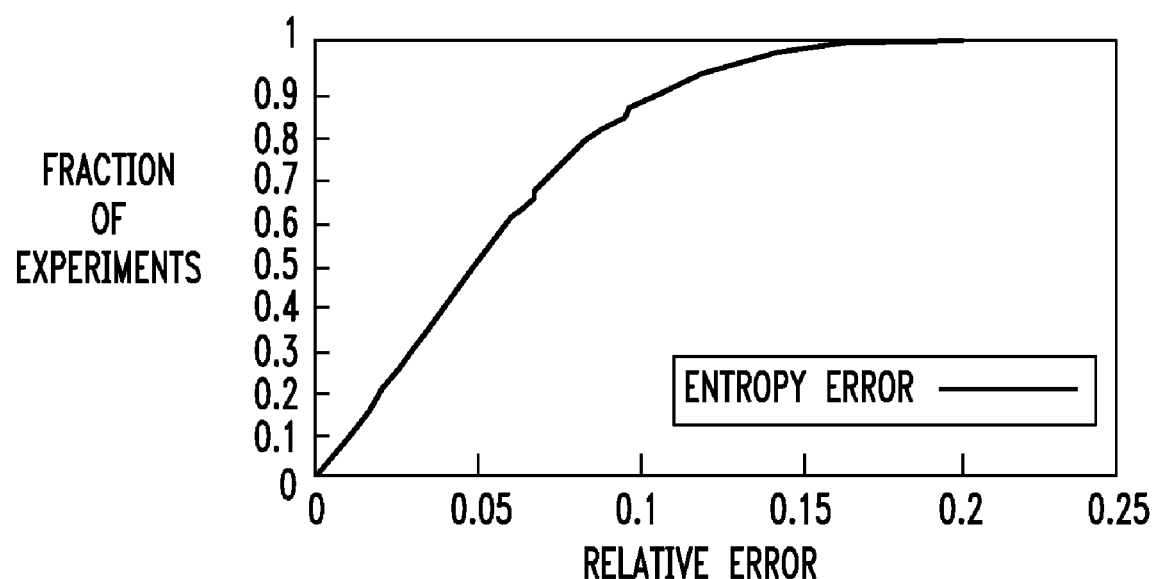
FIG. 12 shows an error plot for the entropy is comparable to that for the entropy norm.

The performance of the entropy estimator 200 in computing the actual entropy (as opposed to the entropy norm) of the OD flows is evaluated. The computation of entropy can have additional error since we need to make use of sketches to estimate the total volume of traffic between a source and destination. In FIG. 12 the error plot for the entropy is comparable to that for the entropy norm. Hence, this confirms that the entropy estimator 200 is a robust estimator of the entropy of OD flows.

While preferred embodiments of the present invention have been described herein, it is expressly noted that the present invention is not limited to these embodiments, but rather the intention is that additions and modifications to what is expressly described herein are also included within the scope of the invention. Moreover, it is to be understood that the features of the various embodiments described herein are not mutually exclusive and can exist in various combinations and permutations, even if such combinations or permutations are not made explicit herein, without departing from the spirit and scope of the invention.

What is claimed is:

1. A method of estimating entropy in a network comprising:
    generating a first sketch associated with at least one ingress flow in a network by a first router;
    generating a second sketch associated with at least one egress flow in the network, the at least one ingress flow and the at least one egress flow forming an origin-destination (OD) flow pair by a second router; and
    determining an OD flow entropy based on the first and second sketches using an entropy estimator implemented by a computing device,
    wherein determining an OD flow entropy comprises:
        extracting a first Lp norm from the first sketch and a second Lp norm from the second sketch; and
        determining an intersection between the first and second sketches using the Intersection Measurable Property (IMP).

2. The method of claim 1, wherein determining an OD flow entropy comprises determining an entropy norm using the intersection between the first and second sketches and an approximation for x*ln(x) for all x from about 1 to about 1000.

3. The method of claim 1, wherein determining an OD flow entropy comprises determining a total number of packets in a stream using at least one of the first and second sketches.

4. The method of claim 3, wherein determining an origin-destination (OD) flow entropy comprises computing an estimate for the OD flow entropy using the entropy norm and the total number of packets.

5. The method of claim 1, wherein generating a first sketch comprises:
    passing a packet to a bucket based on a flow label associated with the packet; and incrementing at least one counter in the first sketch based on a packet identification associated with the packet.

6. A non-transitory computer-readable medium comprising instructions executable by a computing device for estimating entropy in a network by:
generating a first sketch associated with at least one ingress flow in a network;
generating a second sketch associated with at least one egress flow in the network, the at least one ingress flow and the at least one egress flow forming an origin-destination (OD) flow pair; and
determining an OD flow entropy based on the first and second sketches,
wherein determining an OD flow entropy comprises:
extracting a first Lp norm from the first sketch and a second Lp norm from the second sketch; and
determining an intersection between the first and second sketches using the Intersection Measurable Property (IMP).

7. The medium of claim 6, wherein determining an OD flow entropy comprises determining an entropy norm using the intersection between the first and second sketches and an approximation for x*ln(x) for all x from about 1 to about 1000.

8. The medium of claim 6, wherein determining an OD flow entropy comprises determining a total number of packets in a stream using at least one of the first and second sketches.

9. The medium of claim 8, wherein determining an origin-destination (OD) flow entropy comprises computing an estimate for the OD flow entropy using the entropy norm and the total number of packets.

10. The medium of claim 6, wherein generating a first sketch comprises:
passing a packet to a bucket based on a flow label associated with the packet; and
incrementing at least one counter in the first sketch based on a packet identification associated with the packet.

11. A system for estimating entropy in a network comprising:
a computing device configured to generate a first sketch associated with at least one ingress flow in a network, generate a second sketch associated with at least one egress flow in the network, the at least one ingress flow and the at least one egress flow forming an origin-destination (OD) flow pair, and to determine an OD flow entropy based on the first and second sketches,
wherein the computing device is configured to extract a first Lp norm from the first sketch and a second Lp norm from the second sketch and determine an intersection between the first and second sketches the Intersection Measurable Property (IMP).

12. The system of claim 11, wherein the computing device is configured to determine an entropy norm using the intersection between the first and second sketches and an approximation for x*ln(x) for all x from about 1 to about 1000.

13. The system of claim 11, wherein the computing device is configured to determine a total number of packets in a stream using at least one of the first and second sketches.

14. The system of claim 13, wherein the computing device is configured to compute an estimate for the OD flow entropy using the entropy norm and the total number of packets.

15. The system of claim 11, wherein the computing device is configured to pass a packet to a bucket based on a flow label associated with the packet and increment at least one counter in the first sketch based on a packet identification associated with the packet.

* * * * *